March 26, 1935.　　　　N. WYETH　　　　1,995,910

SHOCK ABSORBER

Filed Jan. 30, 1933　　　2 Sheets-Sheet 1

INVENTOR
NATHANIEL WYETH
BY
ATTORNEYS

March 26, 1935.　　　　N. WYETH　　　　1,995,910

SHOCK ABSORBER

Filed Jan. 30, 1933　　　　2 Sheets-Sheet 2

INVENTOR
NATHANIEL WYETH
BY
ATTORNEYS

Patented Mar. 26, 1935

1,995,910

UNITED STATES PATENT OFFICE 1,995,910

SHOCK ABSORBER

Nathaniel Wyeth, Detroit, Mich., assignor, by mesne assignments, to General Motors Corporation, Detroit, Mich., a corporation of Delaware Application January 30, 1933, Serial No. 654,183

8 Claims. (Cl. 188—88)

This invention relates to improvements in hydraulic shock absorbers.

It is among the objects of the present invention to provide an hydraulic shock absorber capable of being adjusted manually to vary the resistance offered by the shock absorber in accordance with the desires of the operator of the vehicle.

This object is attained in the present invention by providing manually adjustable means which may be operated to increase or decrease restriction to the fluid flow by an orificed control device and at the same time increase or decrease the tension of the resilient member which yieldably urges said fluid flow control device into fluid restricting position.

Further objects and advantages of the present invention will be apparent from the following description, reference being had to the accompanying drawings, wherein a preferred embodiment of one form of the present invention is clearly shown.

Figure 4:
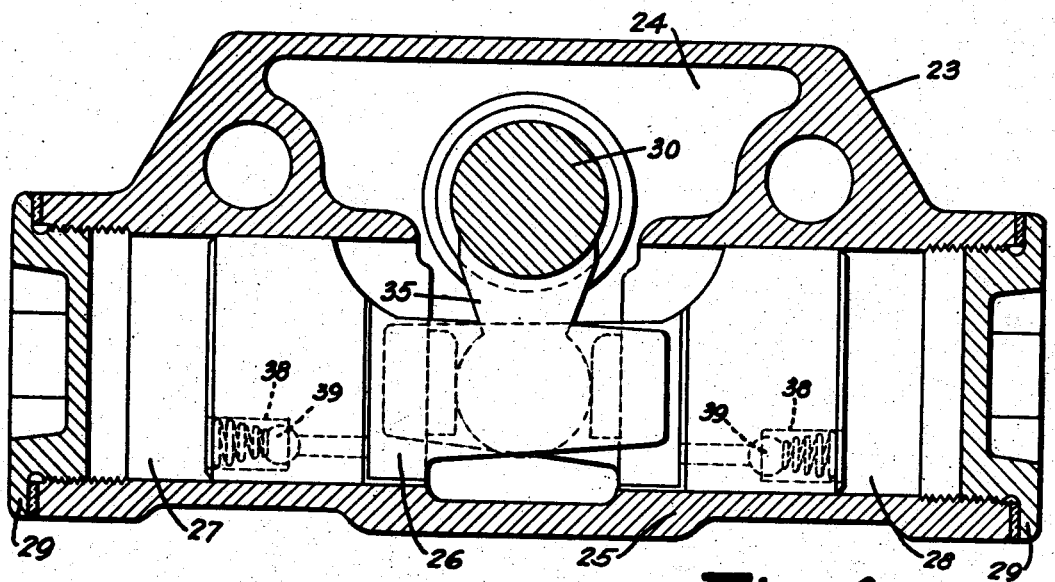
Fig. 4 is a longitudinal sectional view of the shock absorber taken through the center of the cylinder showing the fluid displacement member and is its operating member.
Figure 5:
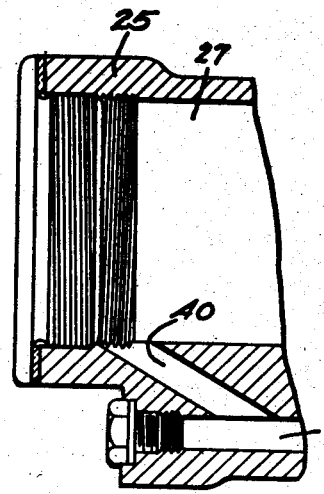
Fig. 5 is a detail fragmentary sectional view of one end of the shock absorber cylinder showing the fluid passage leading therefrom.

Referring to the drawings, the numeral 20 designates the frame of the vehicle having vehicle springs 21 hingedly attached thereto, which springs support the frame 20 upon the vehicle axle 22. The shock absorber comprises a casing 23 providing a fluid reservoir 24 and a cylinder 25. As shown in Fig. 4, this cylinder has a piston 26 reciprocably supported therein, which piston forms the spring compression control chamber 27 on one end of the cylinder and the spring rebound control chamber 28 at the opposite end of the cylinder. The open ends of the cylinder are closed by cylinder head caps 29 provided with gaskets to seal against fluid leaks.

In the shock absorber casing a shaft 30 is mounted transversely thereof, one end of this shaft extending outside the shock absorber and having a shock absorber operating arm 31 provided thereon. The free end of this arm is swively secured to one end of a link 32, the opposite end of said link being swively anchored to a member 33 which is clamped to the axle 22 by clamping member 34. Within the shock absorber casing 23 shaft 30 has a lever 35 provided thereon which extends into a recess intermediate the ends of the piston 26 and acts as the piston operating member. In response to rotations of the shaft 30, lever 35 is oscillatable to reciprocate the piston 26 within the cylinder. In each end of the piston there is provided a passage 38 having a ball check valve 39 therein which may be termed a replenishing valve. Each respective valve permits fluid to flow from the reservoir 24 into the respective chambers 27 or 28 in response to the movement of the piston away from the respective ends 29 of said chambers. However, these valves 39 substantially prevent any fluid from being discharged from the respective chambers through the piston passages 38.

Figure 2:
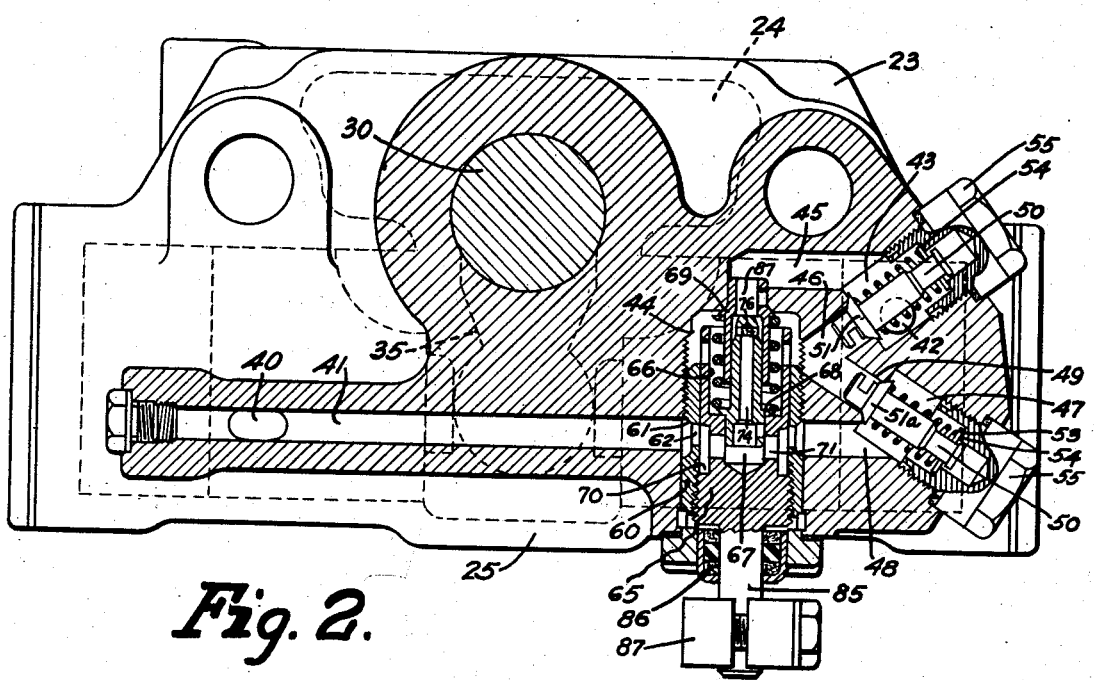
Fig. 2 is a longitudinal sectional view showing the arrangement of the fluid flow control devices in the shock absorber.

Chamber 27 has a duct 40 leading therefrom into the duct 41. A similar duct 42 leads from chamber 28 into a valve chamber 43. Duct 41. terminates in a recess 44 as shown in Fig. 2. The valve chamber 43 has a duct or passage 45 leading therefrom, this passage terminating also in the recess 44 in the casing as shown in Fig. 2. Another passage 46 leads from the valve chamber 43 into the recess 44. A valve chamber 47 similar to 43 is in communication with passage 48 which is substantially an extension of duct or passage 41 providing communication between the recess 44 and the valve chamber 47. Like valve chamber 43, chamber 47 has a passage 49 leading from it into the recess 44. Each valve chamber 43 and 47 has a check valve yieldably urged into seating engagement with the casing, each check valve permitting fluid to flow from the recess 44 into its respective valve chamber 43 or 47, but not permitting fluid to flow from either of said valve chambers 43 or 47 through the respective ducts 46 and 49 into the recess 44. Inasmuch as both valves in chambers 43 and 47 are alike, only one will be described detailedly.

Figure 7:
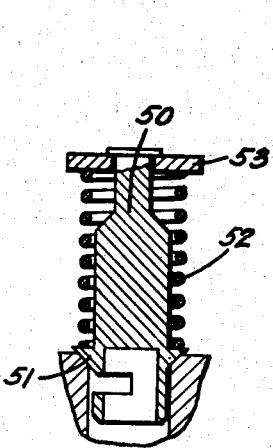
Fig. 7 is an enlarged sectional view showing one of the check valves of the device.
Figure 6:
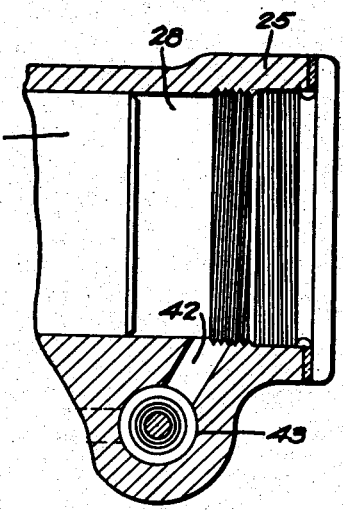
Fig. 6 is a view similar to Fig. 5 showing the opposite end of the shock absorber and the duct leading therefrom.

Referring to Figs. 2 and 7, the valve is shown comprising a body portion 50 having a flange 51 adapted to be moved into engagement with the seat provided with the casing by a spring 52 which is interposed between the flange 51 of the valve and abutment collar 53 engaging a shoulder 54 provided in the recessed portion of a screw plug 55.

Figure 3:
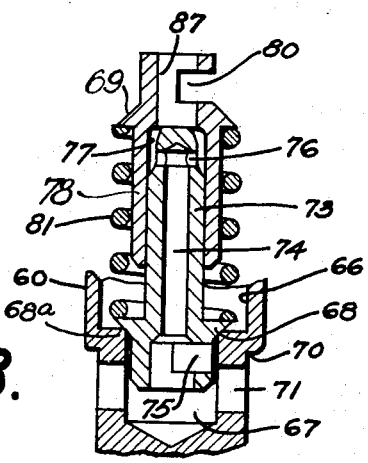
Fig. 3 is a detail sectional view, on an enlarged scale, showing the adjustable fluid flow control devices of the shock absorber.

Interior threads are provided in the recess 44 for receiving the inner threaded end of a sleeve 60, which sleeve has an annular groove 61 adapted to align with the duct 41 and having also opening 62 providing communication between the groove 61 and the interior of the sleeve. The sleeve 60 is interiorly threaded to receive the threaded portion of a plug 65, the interior end of which is recessed as at 66, a smaller diameter counter-recess 67 leading from recess 66 as shown in Fig. 2. The shoulder presented by these two different diameter recesses provides a seat for the flange 68 of the one pressure release valve, while the shoulder presented at the inner end of recess 44 provides a seat for the flange of the other pressure release valve 69. Both these pressure release valves have body portions which telescopically engage as shown in Fig. 2. Plug 65 has an annular groove 70 of such length as to be in continuous communication with the side opening 62 in the sleeve 60 and side openings 71 are provided in the plug so as to connect the groove 70 with the smaller diameter recessed portion 67 of said plug. From this it may be seen that there is always communication between duct 41 and the recess 67 through the annular chamber provided by groove 61, side opening 62 in sleeve 60, the annular chamber provided by groove 70 in plug 65 and the side opening 71 in said plug. The pressure release valve mechanism is detailedly shown in Fig. 3. Here the flange 68 is shown seated upon its valve seat 68a, the body portion 73 of the valve having a central passage 74 which communicates with the recess 67. A side opening 75 in the portion of the valve extending into the recess 67 permits fluid to be ejected from one side of the valve so as to provide an unbalanced valve which eliminates chattering. A cross passage 76 at the inner end of the body portion 73 leads from the inner end of central passage 74 of said body portion into an annular chamber 77 provided inside the tubular body portion 78 of valve 69 by the reduced end of the body portion 73. Like the other pressure release valve, this valve 69 has a side opening 80. A common spring 81, interposed between the valves 68 and 69, yieldably urges said valves into engagement with their respective seats. The plug 65 has a reduced portion 85 extending therefrom to the outside of the shock absorber, a proper packing 86 being provided around said plug to prevent leaks. An actuator lever 87 is secured to the plug outside the shock absorber for rotating the plug.

Referring again to Fig. 3, it will be seen that the reduced end of the body portion 73 of valve 68 is substantially adapted to be moved into the passage 87 in valve 69 when said two valves are moved together so that under these circumstances fluid that has been flowing through the interior passage provided by the central passage 74 in valve 68, cross passages 76 in said valve, annular chamber 77 and passage 87 in valve 69 will be increasingly restricted or substantially shut off. It may consequently be said of these two valves that between them they provide a fluid flow orifice which establishes a constant fluid flow so long as the valves are not moved relative to each other, but which may be increasingly restricted or entirely shut off by relative movements of the valves 68 and 69.

The threaded connections between plug 65 and stationary sleeve 60 provide that when the plug 65 is rotated in one direction, it will move valve 68 toward valve 69, thereby decreasing the orifice presented between said valves and also at the same time increasing the compression of the spring 81 thus requiring a greater fluid pressure to move either one of the valves 68 or 69 from its respective seat. When operating in the other direction, however, plug 65 will permit valve 68 to be moved further away from valve 69 through the effect of spring 81 and consequently the orifice presented between these two valves is increased, thereby reducing the restriction offered by this orifice and simultaneously decreasing the compression of the spring 81, thus requiring a lesser fluid pressure to move either one of said valves from its seat.

The shock absorber functions in the following manner:

In response to the road wheels of the vehicle striking an obstruction in the roadway, axle 21 will be thrust toward the frame 20, causing a compression of the vehicle springs 21 and likewise a clockwise rotation of the arm 31 due to the link connection 31 with said axle 22. Now the lever 35 will be rotated clockwise and piston 26 will be moved toward the left as regards Figs. 1, 2 and 4, thereby exerting a pressure upon the fluid within the spring compression control chamber 27. Fluid will now be forced from said chamber 27 through duct 40 into the duct 41; however, it cannot provide a continued flow through duct 48 and valve chamber 47, due to the fact that check valve 51a is provided in this chamber. The first flow of fluid is established through side opening 62 in the stationary sleeve 60 into the annular chamber 70 through side openings 71 in plug 65 into the recess 67 through the central passage 64 of valve 68, cross openings 76 into the annular chamber 77 and through the orifice presented between the reduced end of the body portion 73 of valve 68 and the annular edge of passage 87 in valve 69 through said passage 87 in the valve 69 through duct 45 into the chamber 43 from whence it may flow through duct 42 into the spring rebound control chamber 48.

If the fluid pressure within chamber 27 cannot properly be relieved by the orifices so presented between the two valves 68 and 69, then valve 68 must give way to the pressure compressing its spring 81, thereby gradually reducing the orifice and establishing a flow between the valve 68 and its seat 68a into the recess 66 from whence the fluid may flow through passage 46 against valve 51, urging said valve from its seat against the effect of spring 52 so as to establish a flow of fluid into its chamber 43 from whence the flow may continue through duct 42 on its way to the rebound control chamber 48.

Figure 1:
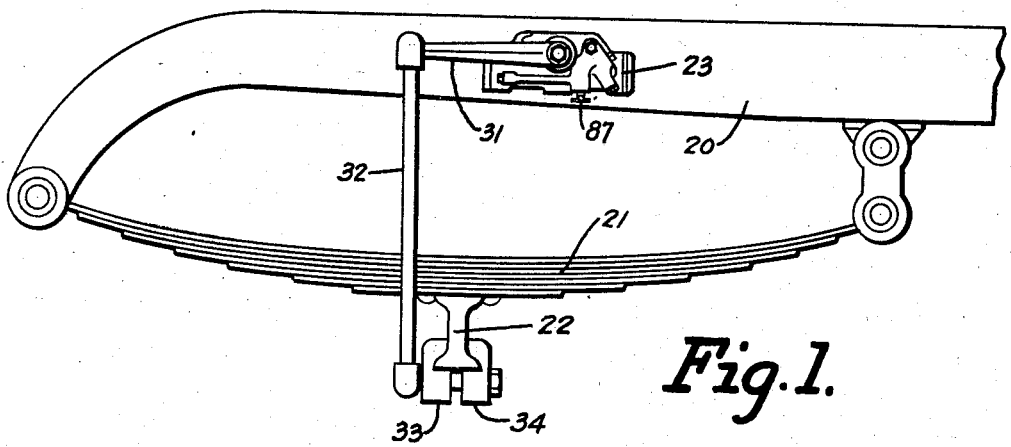
Fig. 1 is a fragmentary side view of the vehicle chassis, a shock absorber embodying the present invention being shown applied to the frame of the vehicle. For the sake of clearness, the road wheels of the vehicle have been omitted.

Upon the return of the vehicle springs 21 from their compressed position to the normal load position, the piston movement of the shock absorber will be reversed in this case, moving toward the right as regards Figs. 1, 2 and 4 and thus exerting a pressure upon the fluid within the spring rebound control chamber 28. Now fluid is urged from said chamber through duct 42 into the valve chamber 43, this fluid necessarily flowing through the duct or passage 45 and through the interior passages and orifices presented by valves 69 and 68 into the recess 67 and back to the spring compression control chamber 28 via the openings 71 and 62 and ducts 41 and 40 respectively. If the pressure is too great properly to be relieved through the orifices presented by valves 69 and 68, then valve 69 is moved from its seat to establish a flow between said valve and its seat into the recess 44 from whence the fluid will flow through passage 49, moving valve 51a from its seat to flow into the chamber 47, thence through duct 48, side openings 62 and 71 into ducts 41 and 40 into the chamber 27.

If, while operating the vehicle, the operator finds that his shock absorbers are not providing sufficient resistance to body and axle movements in accordance with the nature of the road over which the vehicle is being operated, he may, through proper controls, operate the levers 87 of the respective shock absorbers to screw plug 65 into the casing so that the seat provided by said plugs approaches more closely the seat provided by the casing. This results in the movement of the valve 68 into closer relation with valve 69 and consequently the orifice presented between said two valves will be reduced and simultaneously the spring 81 will be compressed. This, as may clearly be seen, provides a greater restriction at the fluid flow orifice presented between the two valves 68 and 69 and at the same time requires a greater fluid pressure to move valves 68 and 69 from their seats to establish flows of fluid past said valves in either direction and consequently the shock absorber will offer greater resistance to body and axle movements. If, on the other hand, he finds that the shock absorbers are offering too great resistance, plugs 65 are screwed out of the casing in which instance the orifice presented between the two valves 68 and 69 is increased and the spring tension or pressure reduced, thus the shock absorbers will offer comparatively less resistance to body and axle movements, or more specifically will permit freer movements between these two vehicle portions.

In the present invention applicant has provided a shock absorber capable of being adjusted to provide suitable resistance in accordance with the nature of the road over which the vehicle is being operated. If the road is rough and bumpy and the operator feels that his shock absorbers are not providing suitable resistance, the lever 87 of the shock absorber is operated in one direction to increase shock absorber resistance, while on the other hand if he finds that in driving over a smooth highway or boulevard the shock absorbers are providing too stiff a ride, then the lever 87 of the shock absorber may be operated in an opposite direction whereby the resistance offered by the shock absorbers is substantially reduced and the vehicle springs are then permitted to provide proper cushioning means.

While the form of embodiment of the present invention as herein disclosed constitutes a preferred form, it is to be understood that other forms might be adopted, all coming within the scope of the claims which follow.

What is claimed is as follows:

1. In an hydraulic shock absorber, the combination with a casing having two fluid displacement chambers connected by a duct; of two pressure release valves in said duct adapted, in response to fluid pressure, to establish flows through the duct in opposite directions respectively, said valves normally providing a constant fluid flow orifice; a common spring urging said valves into normal position; and an actuator adapted to be operated simultaneously to change the compression of the spring and the size of the fluid flow orifice.

2. In an hydraulic shock absorber, the combination with a casing having two fluid displacement chambers connected by a duct; of two pressure release valves in said duct adapted, in response to fluid pressure, to establish flows through the duct in opposite directions respectively, said valves normally providing a constant fluid flow orifice; a common spring urging said valves into normal position; and an actuator adapted to be operated to move one valve relatively to the other for simultaneously changing the compression of the spring and the size of the fluid flow orifice.

3. In an hydraulic shock absorber, the combination with a casing having two fluid displacement chambers connected by a duct in which a valve-seat is provided; of an actuator adjustably carried by the casing and providing another valve seat and passages communicating with the duct in the casing; oppositely acting, pressure release valves each adapted to engage a respective valve-seat, said valves having cooperating means providing a constant fluid flow orifice; and a common spring urging said valves upon their respective valve-seats.

4. In an hydraulic shock absorber, the combination with a casing having two fluid displacement chambers connected by a duct in which a valve-seat is provided; of an actuator adjustably carried by the casing and providing another valve-seat and passage communicating with the duct in the casing; a poppet valve engaging each valve-seat, said poppet valves having communicating ducts providing a fluid flow passage through said valves, one of said valves having a portion for restricting said passage; a spring interposed between said valves and urging them apart and upon their seats.

5. In an hydraulic shock absorber, the combination with a casing having two fluid displacement chambers connected by a duct in which a valve-seat is provided; of a fluid flow control device in said duct, comprising two oppositely acting poppet valves having telescopically engaging portions providing a fluid passage through said valves, one of which engages the valve seat in the duct; a spring between the valves urging them apart; and an actuator providing a valve-seat for the other valve and adjustable to move one valve relatively to the other for varying the size of the fluid flow passage through the valves and the compression of the spring between them.

6. In an hydraulic shock absorber, the combination with a casing providing two fluid displacement chambers connected by a duct; of dual means in said duct, one telescopically engaging the other and yieldably urged to prevent fluid flow around them normally, said means cooperating to form a fluid duct normally allowing a fluid flow through them in either direction; and manual means adapted to be operated simultaneously to vary the restriction to the flows of fluid around and through said means.

7. In an hydraulic shock absorber, the combination with a casing providing two fluid displacement chambers connected by a duct; two oppositely acting, spring-loaded valves in the duct, one having a body portion telescopically engaged by the body portion of the other, said valves normally preventing fluid flow around them; cooperating means provided by the telescopically engaged portions of said valves for establishing a constantly restricted flow of fluid through them in either direction; and adjusting means accessible outside the shock absorber, adapted more or less to telescope said valves for simultaneously varying the spring load upon the valves and the restriction to the flow of fluid through said valves.

8. In an hydraulic shock absorber, the combination with a casing providing two fluid displacement chambers connected by a duct; two oppositely acting valves in said duct, having telescopically engageable parts; a spring urging said valves apart normally to prevent fluid in the duct from flowing around them; a passage in each valve providing for the flow of fluid through the valves, said fluid passage being adapted to be restricted by the introduction of one portion of one valve telescopically into a portion of the other valve, and a manual member engaging one of said valves and adapted to be operated to move said valve relatively to the other to effect such introduction of valve parts and to an increased compression of the valve spring.

NATHANIEL WYETH.